US009755201B2

(12) United States Patent
Frazier

(10) Patent No.: US 9,755,201 B2
(45) Date of Patent: Sep. 5, 2017

(54) ADJUSTABLE RACK AND METHOD OF MAKING AND USING THE SAME

(71) Applicant: Environmental Compliance Solutions, LLC, Montclair, CA (US)

(72) Inventor: Douglas Frazier, Claremont, CA (US)

( * ) Notice: Subject to any disclaimer, the term of this patent is extended or adjusted under 35 U.S.C. 154(b) by 0 days.

(21) Appl. No.: 15/362,726

(22) Filed: Nov. 28, 2016

(65) Prior Publication Data

US 2017/0077470 A1    Mar. 16, 2017

Related U.S. Application Data

(63) Continuation of application No. 14/738,547, filed on Jun. 12, 2015, now Pat. No. 9,504,319.

(51) Int. Cl.
| | |
|---|---|
| *A47B 45/00* | (2006.01) |
| *H01M 2/10* | (2006.01) |
| *A47B 47/02* | (2006.01) |

(52) U.S. Cl.
CPC .......... *H01M 2/1077* (2013.01); *A47B 45/00* (2013.01); *A47B 47/027* (2013.01); *A47B 47/028* (2013.01)

(58) Field of Classification Search
CPC ....... A47B 47/00; A47B 47/02; A47B 47/021; A47B 47/028; A47B 47/027; A47B 47/0025; A47B 47/0083; A47B 45/00; A47F 5/10; A47F 5/0081; A47F 5/101
USPC ................................. 211/191, 192, 189, 175
See application file for complete search history.

(56) References Cited

U.S. PATENT DOCUMENTS

| | | | | |
|---|---|---|---|---|
| 3,533,502 A | * | 10/1970 | Hansen ................... | A47B 45/00 206/386 |
| 4,236,854 A | * | 12/1980 | Rogers ..................... | B60P 7/15 410/121 |
| 4,982,851 A | * | 1/1991 | Konstant ................ | B65G 1/026 211/151 |
| 5,181,815 A | * | 1/1993 | Haberkorn .............. | B60P 7/135 182/152 |
| 5,390,802 A | * | 2/1995 | Pappagallo ............. | A47B 45/00 211/187 |
| 6,431,668 B1 | * | 8/2002 | Reddicliffe ........... | A47B 88/044 312/334.1 |
| 6,702,124 B2 | * | 3/2004 | Lauchner ............. | H05K 7/1421 211/192 |
| 7,008,719 B2 | * | 3/2006 | Zaffino ................ | H01M 2/1077 137/312 |

(Continued)

*Primary Examiner* — Paola Agudelo
(74) *Attorney, Agent, or Firm* — Robert J. Lauson, Esq.; Lauson & Tarver LLP

(57) ABSTRACT

An adjustable storage rack configured to support a variety of devices, including valve regulated or flooded lead acid batteries. In one embodiment, the adjustable storage rack includes a series of stanchions, a series of side rails extending between at least two of the stanchions, and a series of end rails extending between two of the side rails. The adjustable storage rack may also include a stanchion adjustment assembly slidably coupling one of the stanchions to one of the side rails. The adjustable storage rack may also include first and second end rail adjustment assemblies. The first end rail adjustment assembly slidably couples a first end portion of one of the end rails to one of the side rails, and the second end rail adjustment assembly slidably couples a second end portion of the end rail to a second one of the side rails.

14 Claims, 8 Drawing Sheets

(56) References Cited

U.S. PATENT DOCUMENTS

| | | | | |
|---|---|---|---|---|
| 8,348,071 | B1* | 1/2013 | Janlert | F16M 5/00 |
| | | | | 211/175 |
| 8,721,012 | B2* | 5/2014 | Chen | A47B 88/08 |
| | | | | 211/26 |
| 2001/0040142 | A1* | 11/2001 | Haney | A47B 88/044 |
| | | | | 211/183 |
| 2005/0167383 | A1* | 8/2005 | Taccolini | A47F 5/13 |
| | | | | 211/189 |
| 2007/0039913 | A1* | 2/2007 | Chen | A47B 88/044 |
| | | | | 211/192 |
| 2009/0194171 | A1* | 8/2009 | Frazier | H01M 2/364 |
| | | | | 137/312 |
| 2014/0326685 | A1* | 11/2014 | Frazier | A47B 97/00 |
| | | | | 211/13.1 |
| 2015/0122759 | A1* | 5/2015 | Shen | H05K 7/1488 |
| | | | | 211/175 |

* cited by examiner

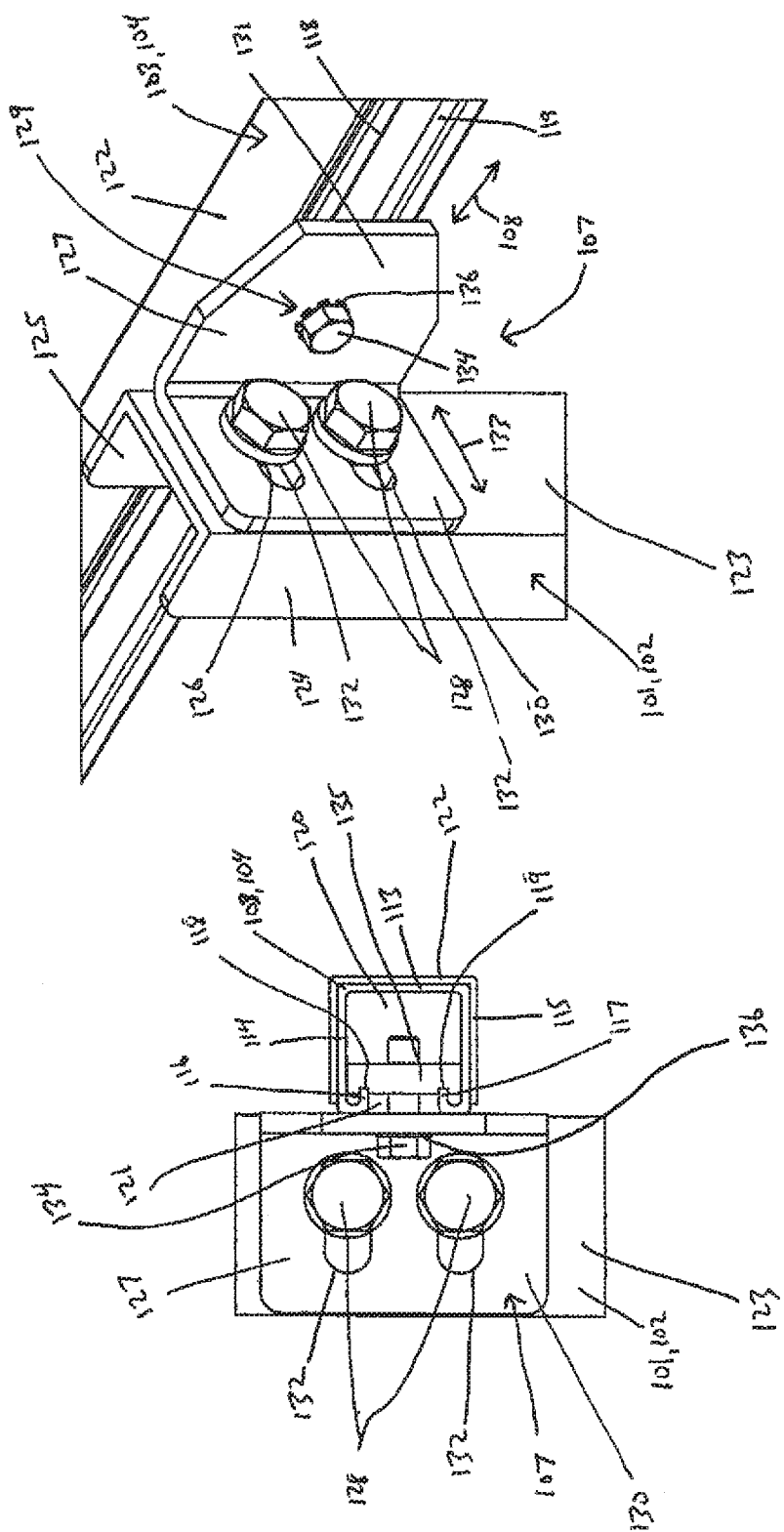

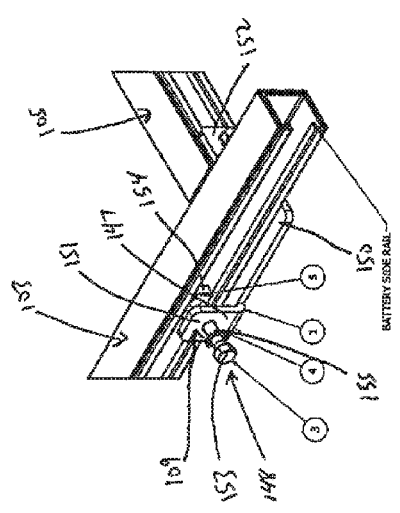

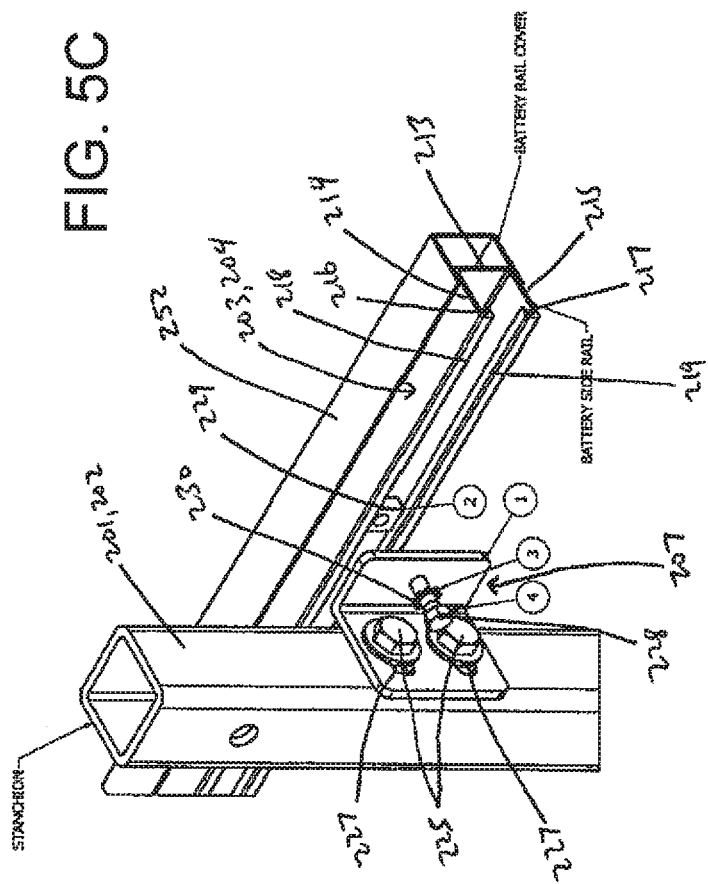

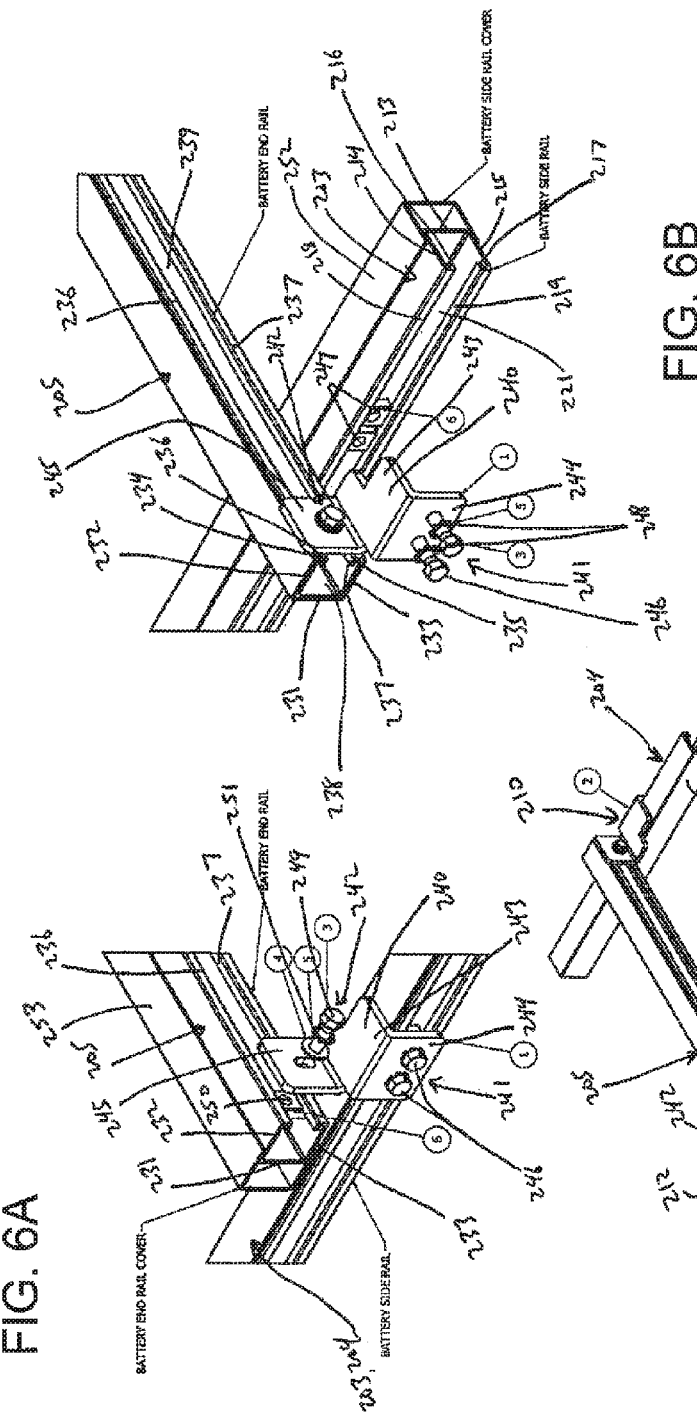

ADJUSTABLE RACK AND METHOD OF MAKING AND USING THE SAME

CROSS-REFERENCE TO RELATED APPLICATION

This application is a continuation of U.S. patent application Ser. No. 14/738,547, filed on Jun. 12, 2015, which issued as U.S. Pat. No. 9,504,319, which claims priority on U.S. Provisional Application Ser. No. 62/011,995, filed on Jun. 13, 2014 and titled "ADJUSTABLE RACK AND METHOD OF MAKING AND USING THE SAME" the contents of each are fully incorporated herein by reference.

FIELD

The present invention relates generally to storage racks and, more particularly, to adjustable storage racks.

BACKGROUND

Storage racks are commonly used in various industries to support and/or store a variety of devices in a manner that efficiently utilizes the available storage space. However, many conventional storage racks have a fixed size, which renders it impossible or impractical to reconfigure the storage rack to accommodate objects having different sizes. Accordingly, conventional fixed-size storage racks may be unsuitable for storing objects that have different sizes. Additionally, it may be cost-inefficient for consumers to buy a variety of different fixed-size storage racks to accommodate different sized devices.

Additionally, conventional storage racks, if adjustable, may sacrifice rigidity and durability to achieve adjustability. Accordingly, conventional adjustable storage racks may not be configured to satisfy seismic standards (i.e., conventional adjustable storage racks may not be suitable for use in geographic regions that are prone to earthquakes). Thus, conventional adjustable storage racks may be particularly unsuitable for storing hazardous materials, such as valve regulated or flooded lead acid batteries, which are prone to fall and/or spill during a seismic event.

SUMMARY

Embodiments of the present disclosure are directed to various adjustable storage racks and methods of making and using the same. In one embodiment, the adjustable storage rack includes a series of stanchions, a series of side rails, and a series of end rails. Each side rail extending between at least two of the stanchions and each end rail extending between two of the side rails. The adjustable storage rack also includes a stanchion adjustment assembly slidably coupling one of the stanchions to one of the side rails. The adjustable storage rack further includes first and second end rail adjustment assemblies. The first end rail adjustment assembly slidably couples a first end portion of one of the end rails to one of the side rails, and the second end rail adjustment assembly slidably couples a second end portion of the end rail to another one of the side rails. The two side rails may include a pair of inwardly turned lips defining a pair of rails. The stanchion adjustment assembly may include a bracket and a side rail engagement member coupled to the bracket. The side rail engagement member may include a fastener and a nut coupled to one end of the fastener. The nut may engage the pair of rails defined in the side rails. The end rails may include a pair of inwardly turned lips defining a pair of rails. The end rail adjustment assemblies may include a bracket, a side rail engagement member coupled to the bracket, and an end rail engagement member coupled to the bracket. The side rail engagement member may be integral with the bracket. The side rail engagement member may include a fastener, a hook, a rivet, or a stud. The side rail engagement member may include a fastener and a nut coupled to one end of the fastener. The nut may engage the pair of rails defined in the end rails. The end rail engagement member may include a fastener and a nut coupled to one end of the fastener. The nut may engage the rails defined in one of the side rails.

The bracket of the stanchion adjustment assembly may be L-shaped. One of the stanchions may define a series of openings to receive a fastener coupling the stanchion adjustment assembly to the stanchion. The bracket may define a slot to receive the fastener. The adjustable storage rack may also include a clamp assembly coupled to the first and second side rails. The clamp assembly may include a first bracket slidably coupled to the first side rail, a second bracket slidably coupled to the second side rail, and at least one tie rod coupling the first bracket to the second bracket.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 2A-2C are a perspective view, a side view, and an exploded perspective view, respectively, of a stanchion adjustment assembly slidably coupling a stanchion to a side rail according to the embodiment illustrated in FIG. 1;

FIGS. 3A-3C are a perspective view, a side view, and an exploded perspective view of an end rail adjustment assembly slidably coupling an end rail to a pair of side rails according to the embodiment illustrated in FIG. 1;

FIGS. 5A-5C are a perspective view, a side view, and an exploded perspective view, respectively, of a stanchion adjustment assembly slidably coupling a stanchion to a side rail according to the embodiment illustrated in FIG. 4; and FIGS. 6A-6C are a first exploded perspective view, a second exploded perspective view, and a perspective view of an end rail adjustment assembly slidably coupling an end rail to a pair of side rails according to the embodiment illustrated in FIG. 4.

DETAILED DESCRIPTION

Embodiments of the present disclosure are directed to various adjustable storage racks and methods of making and using the same. The storage racks of the present disclosure may be adjusted into various sizes and configurations to accommodate a variety of differently sized devices (e.g., batteries, such as flooded and/or valve regulated lead acid batteries). In one embodiment in which the adjustable storage rack of the present disclosure is used to support batteries, the batteries may be used for any suitable purposes, such as, for instance, as backup power supply for data communication centers, telecommunication equipment, broadband equipment, and/or computer equipment.

Figure 1:
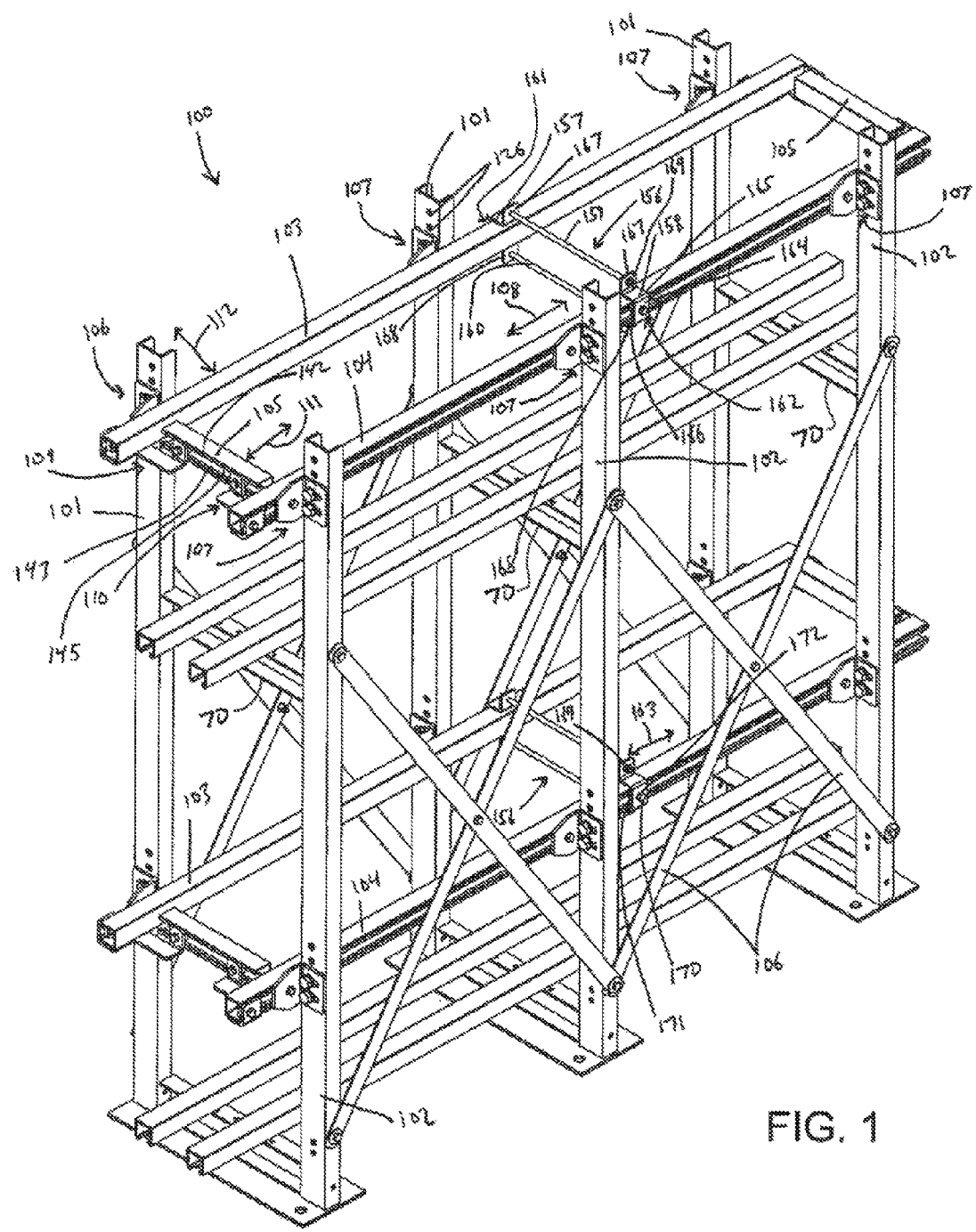
FIG. 1 is a perspective view an adjustable storage rack according to one embodiment of the present disclosure.

With reference now to FIG. 1, an adjustable storage rack 100 according to one embodiment of the present disclosure includes a plurality of front and rear stanchions 101, 102, respectively, each of the front stanchions 101 connected to its respective rear stanchion 102 through a cross member 70. The adjustable storage rack 100 also includes a plurality of front and rear side rails 103, 104, respectively, extending between and interconnecting the front and rear stanchions 101, 102, respectively. The adjustable storage rack 100 further includes a plurality of end rails 105. In the illustrated embodiment, the end rails 105 extend between and interconnect respective pairs of front and rear side rails 103, 104. In the illustrated embodiment, the adjustable storage rack 100 includes two end rails 105 extending between each pair of front and rear side rails 103, 104, although in one or more alternate embodiments, the adjustable storage rack 100 may include any other suitable number of end rails 105 for each pair of front and rear side rails 103, 104. The adjustable storage rack 100 may also include a plurality of diagonal support braces 106 extending between adjacent stanchions 101, 102. In the illustrated embodiment, the diagonal support braces 106 are arranged in an X-shaped configuration or pattern, although in one or more alternate embodiments, the diagonal support braces 106 may be arranged in any other suitable configuration. Additionally, in one embodiment, the front and rear stanchions 101, 102 may be substantially vertical and the side rails 103, 104 and the end rails 105 may be substantially horizontal, although in one or more alternate embodiments, the stanchions 101, 102, the side rails 103, 104, and the end rails 105 may have any other suitable orientations.

With continued reference to the embodiment illustrated in FIG. 1, the adjustable storage rack 100 also includes a plurality of stanchion adjustment assemblies 107 slidably coupling the front and rear stanchions 101, 102 to the front and rear side rails 103, 104, respectively. The stanchion adjustment assemblies 107 are configured to facilitate laterally adjusting the position of the stanchions 101, 102 (e.g., the stanchion adjustment assemblies 107 are configured to facilitate laterally sliding (arrow 108) the stanchions 101, 102 along the length of the side rails 103, 104 and into the desired positions).

Still referring to the embodiment illustrated in FIG. 1, the adjustable storage rack 100 also includes a plurality of front and rear end rail adjustment assemblies 109, 110 slidably coupling the end rails 105 to the side rails 103, 104, respectively. As described in more detail below, the end rail adjustment assemblies 109, 110 are configured to facilitate laterally adjusting the position of the end rails 105 (e.g., the end rail adjustment assemblies 109, 110 are configured to facilitate laterally sliding (arrow 111) the end rails 105 along the length of the side rails 103, 104 and into the desired positions). The end rail adjustment assemblies 109, 110 are also configured to facilitate fore and aft adjustments of the side rails 103, 104 and the stanchions 101, 102 (e.g., the end rail adjustment assemblies 109, 110 are configured to facilitate sliding (arrow 112) the side rails 103, 104 and the stanchions 101, 102 connected thereto along a portion of the length of the end rails 105 and into the desired positions).

Figure 2C:
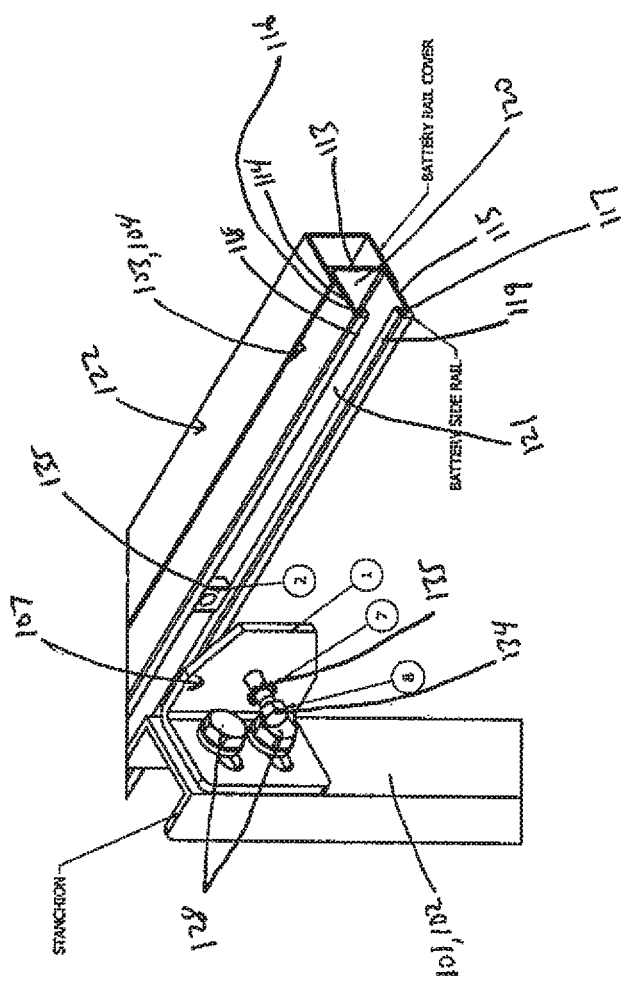

With reference now to FIGS. 2A-2C, in the illustrated embodiment each of the side rails 103, 104 is a C-channel having a web 113 and a pair of upper and lower flanges 114, 115 extending from opposite ends of the web 113. In the illustrated embodiment, web 113 is vertical or substantially vertical and the flanges 114, 115 are horizontal or substantially horizontal, although in one or more alternate embodiments, the web 113 and the flanges 114, 115 may have any other suitable orientation. Additionally, although in the illustrated embodiment the flanges 114, 115 are parallel or substantially parallel to each other, in one or more alternate embodiments, the flanges 114, 115 may be non-parallel (e.g., the flanges 114, 115 may taper toward or away from each other). Each of the flanges 114, 115 includes a first end coupled to the web 113 and a free second end opposite the first end. The free ends of the flanges 114, 115 opposite the web 113 include inwardly turned lips 116, 117, respectively, extending along their length. In the illustrated embodiment, each of the inwardly turned lips 116, 117 is J-shaped, although in one or more alternate embodiments, the inwardly turned lips 116, 117 may have any other suitable shape. Together, the inwardly turned lips 116, 117 define a pair of tracks or rails 118, 119 configured to facilitate sliding (arrow 108 in FIG. 1) the stanchion adjustment assemblies 107 and the end rail adjustment assemblies 109, 110 along the length of the side rails 103, 104, as described in more detail below. Additionally, each of the side rails 103, 104 also defines a cavity 120 and an opening 121 between the pair of rails 118, 119 or between the upper and lower flanges 114, 115. The opening 121 between the pair of rails 118, 119 opens up into the cavity 120.

In the embodiment illustrated in FIGS. 2A-2C, the adjustable storage rack 100 also includes a plurality of side rail covers 122. The side rail covers 122 may be the same or substantially the same material as the side rails 103, 104 or may be a different material than the side rails 103, 104. Each of the covers 122 is configured to cover the web 113 and at least a portion of the upper and lower flanges 114, 115 of the side rail 103, 104. In the illustrated embodiment, the side rail covers 122 are C-shaped, although in one or more alternate embodiments, the side rail covers 122 may have any other suitable shape depending on the shape of the side rails 103, 104. In one or more alternate embodiments, the adjustable storage rack 100 may be provided without the side rail covers 122.

Still referring to the embodiment illustrated in FIGS. 2A-2C, each of the stanchions 101, 102 is a C-channel having a web 123 and a pair of flanges 124, 125 extending out from opposite ends of the web 123. In one or more alternate embodiments, the stanchions 101, 102 may have any other suitable shape, such as, for instance, a prismatic tube (e.g., a square or rectangular tube), a Z-shaped bar, or an L-shaped bar. The webs 123 of the stanchions 101, 102 also define a plurality of openings 126 (e.g., holes or slots) configured to receive fasteners coupling the stanchion adjustment assemblies 107 to the stanchions 101, 102.

With continued reference to the embodiment illustrated in FIGS. 2A-2C, each of the stanchion adjustment assemblies 107 includes a bracket 127, a pair of fasteners 128 for coupling the bracket 127 to one of the stanchions 101, 102, and at least one side rail engagement member 129 configured to facilitate sliding (arrow 108) the bracket 127 and the stanchion 101, 102 coupled thereto along the length of the side rails 103, 104. In the illustrated embodiment, the bracket 127 is L-shaped and includes a first plate portion 130 configured to abut against the web 123 of the stanchion 101, 102 and a second plate portion 131 configured to abut against one of the side rails 103, 104. The first and second plate portions 130, 131 of the bracket 127 define a substantially 90 degree angle therebetween, although in one or more alternate embodiments, the first and second plate portions 130, 131 may define any other suitable angle therebetween depending on the orientations of the stanchions 101, 102 and the side rails 103, 104. In one or more alternate embodiments, the brackets 127 may be coupled to the stanchions 101, 102 by any other suitable mechanism, such as, for instance, by hooks received in corresponding slots in the stanchion 101, 102. Additionally, in one embodiment, the brackets 127 may be integrally formed with the stanchion 101, 102.

The first plate portion 130 of the bracket 127 defines one or more openings 132. In the illustrated embodiment, the first plate portion 130 defines two horizontally oriented slots 132 configured to receive the pair of fasteners 128 coupling the bracket to the stanchion (e.g., the fasteners 128 extend through the slots 132 in the bracket 127 and into the openings 126 in the stanchion 101, 102. The horizontally oriented slots 132 facilitate fore and aft adjustment of the position of the bracket 127 relative to the stanchion 101, 102. In this manner, the bracket 127 may be adjusted (arrow 133) depending on the position of the side rail 103, 104 relative to the stanchion 101, 102. Although in the illustrated embodiment the brackets 127 of the stanchion adjustment assemblies 107 are L-shaped, in one or more alternate embodiments the brackets 127 may have any other suitable shape, such, for instance, Z-shaped.

In the embodiment illustrated in FIGS. 2A-2C, each of the side rail engagement members 129 includes a fastener 134 (e.g., a hex bolt), a nut 135 (e.g., a serrated nut) threadedly engaged to an end of the fastener 134, and a lock washer 136 configured to prevent the fastener 134 from inadvertently counter-rotating and thereby disengaging the nut 135. In the illustrated embodiment, the nut 135 is received in the cavity or chamber 120 defined by the side rail 103, 104. Additionally, the nut 135 is wider than the opening 121 defined between the rails 118, 119 of the side rail 103, 104 (e.g., the nut 135 is wider than the gap between the inwardly turned lips 116, 117 on the side rail 103, 104). Accordingly, portions of the nut 135 engage the rails 118, 119 of the side rail 103, 104 (i.e., portions of the nut 135 engage the inwardly turned lips 116, 117 on the side rail 103, 104). The engagement between the nut 135 and the rails 118, 119 couples the stanchion adjustment assembly 107 to the side rail 103, 104. Additionally, because the size of the opening 121 between the tracks or rails 118, 119 is smaller than the nut 135, the nut 135 cannot slide out through the opening 121 and thereby inadvertently disengage the rails 118, 119. Additionally, tightening the fastener 134 is configured to draw the nut 135 into tighter engagement with the rails 118, 119 and loosening the fastener 134 is configured to move the nut 135 into looser engagement with the rails 118, 119. Moreover, in one embodiment, the nut 135 may be substantially the same width or wider than the spacing between the upper and lower flanges 114, 115 of the side rails 103, 104 such that the nut 135 cannot rotate within the cavity 120 of the side rail 103, 104. Otherwise, the rotation of the nut 135 would prevent the nut 135 from being drawn into closer engagement with the rails 118, 119 and would also prevent the nut 135 from being moved into looser engagement with the rails 118, 119 when the fastener 134 is tightened or loosened, respectively. In one or more alternate embodiments, the rail engagement member 129 may have any other configuration suitable for slidably engaging the rails 118, 119 of the side rails 103, 104. For instance, in one embodiment, the rail engagement member 129 may include one or more rivets, studs, or hooks. Additionally, in one or more embodiments, the rail engagement member 129 may be integrally formed with the bracket 127.

In use, the lateral position of the stanchions 101, 102 may be adjusted by loosening the fastener 134 and sliding (arrow 108) the stanchion adjustment assemblies 107 and the stanchions 101, 102 along the length of the side rail 103, 104 and into the desired positions. Once the stanchions 101, 102 are in the desired positions, the fasteners 134 may be retightened to secure the stanchions 101, 102 in the desired lateral positions.

With reference now to FIGS. 3A-3C, in the illustrated embodiment the end rails 105 may have the same or substantially the same shape and/or configuration as the side rails 103, 104. In the illustrated embodiment, each end rail 105 is a C-channel having a web 137 and a pair of upper and lower flanges 138, 139 extending out from opposite ends of the web 137. In the illustrated embodiment, web 137 is vertical or substantially vertical and the flanges 138, 139 are horizontal or substantially horizontal, although in one or more alternate embodiments, the base plate and the flanges 138, 139 may have any other suitable orientation. Additionally, although in the illustrated embodiment the flanges 138, 139 are parallel or substantially parallel to each other, in one or more alternate embodiments, the flanges 138, 139 may be non-parallel (e.g., the flanges 138, 139 may taper toward or away from each other). Each of the flanges 138, 139 includes a first end coupled to the web 137 and a free second end opposite the first end. The free ends of the flanges 138, 139 opposite the web 137 include inwardly turned lips 140, 141. In the illustrated embodiment, each of the inwardly turned lips 140, 141 is J-shaped, although in one or more alternate embodiments, the inwardly turned lips 140, 141 may have any other suitable shape. Together, the inwardly turned lips 140, 141 define a pair of rails 142, 143 configured to facilitate sliding (arrow 112) the end rail adjustment assemblies 109, 110, and the side rails 103, 104 and the stanchions 101, 102 coupled thereto, along the end rails 105, as described in more detail below. Additionally, each of the end rails 105 defines a cavity 144 and an opening 145 between the pair of rails 142, 143. The opening 145 between the pair of rails 142, 143 opens up into the cavity 144. As illustrated in FIG. 1, according to one embodiment, the end rails 105 are oriented such that the openings 145 between the pair of rails 142, 143 face outward (e.g., the end rails 105 face away from each other).

In the embodiment illustrated in FIGS. 3A-3C, the adjustable storage rack 100 also includes a plurality of end rail covers 146. Each of the end rail covers 146 is configured to cover the web 137 and at least a portion of the upper and lower flanges 138, 139 of the end rails 105. In the illustrated embodiment, the end rail covers 146 are C-shaped, although in one or more alternate embodiments, the end rail covers 146 may have any other suitable shape depending on the shape of the end rails 105. In one or more alternate embodiments, the adjustable storage rack 100 may be provided without the end rail covers 146.

In the embodiment illustrated in FIGS. 3A-3C, the front and rear end rail adjustment assemblies 109, 110 are slidably coupled to opposite ends of the end rails 105. Accordingly, the front end rail adjustment assembly 109 slidably couples a forward end portion of the end rail 105 to one of the forward side rails 103 and the rear end rail adjustment assembly 110 slidably couples a rear end portion of the end rail 105 to a corresponding one of the rear side rails 104. As illustrated in FIGS. 3A-3C, each of the end rail adjustment assemblies 109, 110 includes a bracket 147 and first and second rail engagement members 148, 149 configured to slidably couple the bracket 147 to one of the side rails 103, 104 and one of the end rails 105, respectively. The first rail engagement member 148 facilitates sliding the bracket 147 and the end rail 105 laterally (arrow 111) along the length of the side rails 103, 104, and the second rail engagement member 149 facilitates sliding the side rails 103, 104 fore and aft (arrow 112) along a portion of the length of the end rails 105.

In the embodiment illustrated in FIGS. 3A-3C, the bracket 147 includes a base plate 150 and first and second upwardly turned flanges 151, 152 extending upward from the base plate 150. In the illustrated embodiment, the base plate 150 is L-shaped, although in one or more alternate embodiments, the base plate 150 may have any other suitable shape, such as, for instance, square or rectangular. Additionally, in the illustrated embodiment, the first upwardly turned flange 151 is vertical or substantially vertical and is substantially parallel to the web 113 of the side rail 103, 104. Further, in the illustrated embodiment, the base plate 150 of the bracket 147 is substantially horizontal and supports the lower flange 115 of the side rail 103, 104. The second upwardly turned flange 152 is vertical or substantially vertical and is substantially parallel to the web 137 of the end rail 105. Accordingly, the bracket 147 of each of the front and rear end rail adjustment assemblies 109, 110 extends from the opening 121 between the rails 118, 119 in the side rail 103, 104, under the side rail 103, 104, and to the opening 145 between the rails 142, 143 in the end rail 105. Additionally, in one embodiment, the first and second upwardly turned flanges 151, 152 extend in the same direction as the side rail 103, 104 and the end rail 105, respectively. Accordingly, in one embodiment in which the side rails 103, 104 are perpendicular or substantially perpendicular to the end rails 105, the first upwardly turned flange 151 on the bracket 147 may be perpendicular or substantially perpendicular to the second upwardly turned flange 152 on the bracket 147. In one or more alternate embodiments, the first and second upwardly turned flanges 151, 152 on the bracket 147 may define any other angle therebetween depending on the angle defined between the end rail 105 and the side rails 103, 104.

The first and second rail engagement members 148, 149 of the end rail adjustment assemblies 109, 110 may be the same or similar to the side rail engagement member 129 of the stanchion adjustment assemblies 107. In the embodiment illustrated in FIGS. 3A-3C, the first and second rail engagement members 148, 149 each includes a fastener 153 (e.g., a hex bolt), a nut 154 (e.g., a serrated nut) threadedly engaged to an end of the fastener 153, and a lock washer 155 configured to prevent the fastener 153 from inadvertently counter-rotating and thereby disengaging the nut 154. In the illustrated embodiment, the nut 154 of the first rail engagement member 148 is received in the cavity or chamber 144 defined by the end rail 105 and the nut 154 of the second rail engagement member 149 is received in the cavity or chamber 120 defined by one of the side rails 103, 104. Additionally, the nuts 154 are wider than the openings 121, 145 defined between the inwardly turned lips 116, 117 and 140, 141 on the side rail 103, 104 and the end rail 105, respectively (e.g., the nuts 154 are wider than the gap between the rails 118, 119 and 142, 143). Accordingly, portions of the nuts 154 engage the rails 118, 119 and 142, 143 of the side rail 103, 104 and the end rail 105, respectively (i.e., portions of the nuts 154 engage the inwardly turned lips 116, 117 and 140, 141 on the side rail 103, 104 and the end rail 105, respectively). The engagement between the nuts 154 and the rails 118, 119 and 142, 143 couples the end rail adjustment assemblies 109, 110 to the side rails 103, 104 and the end rail 105. Additionally, tightening the fasteners 153 is configured to draw the nuts 154 into tighter engagement with the rails 118, 119 and 142, 143 and loosening the fasteners 153 is configured to move the nuts 154 into looser engagement with the rails 118, 119 and 142, 143. In one or more alternate embodiments, the rail engagement members 148, 149 may have any other configuration suitable for slidably engaging the rails 118, 119 and 142, 143 of the side rails 103, 104 and the end rail 105, respectively. For instance, in one embodiment, the rail engagement members 148, 149 may include one or more rivets, studs, or hooks. Additionally, in one or more embodiments, the rail engagement members 148, 149 may be integrally formed with the bracket 147.

In use, the lateral position of the end rails 105 may be adjusted by loosening the fasteners 153 coupling the front and rear end rail adjustment assemblies 109, 110 to the side rails 103, 104 and then sliding (arrow 111) the end rail adjustment assemblies 109, 110 along the rails 118, 119 of the side rails 103, 104 and into the desired position. The fore and aft positions of the side rails 103, 104 may be adjusted by loosening the fasteners 153 coupling the front and rear end rail adjustments assemblies 109, 110 to the end rail 105 and then sliding (arrow 112) the side rails 103, 104 fore and/or aft into the desire positions. Once the end rail 105 and the side rails 103, 104 are in the desired positions, the fasteners 153 may be retightened to secure the end rails 105 and the side rails 103, 104 into the desired positions.

With reference again to the embodiment illustrated in FIG. 1, the adjustable storage rack 100 also includes one or more clamp assemblies 156. Each of the clamp assemblies 156 is configured to engage a pair of front and rear side rails 103, 104 to maintain the spacing between the front and rear side rails 103, 104 (e.g., the clamp assembly 156 is configured to prevent unintended movement of the front and rear side rails 103, 104 away from each other, which could cause one or more of the devices (e.g., batteries) supported on the adjustable storage rack 100 to fall between the front and rear side rails 103, 104). In the illustrated, the clamp assembly 156 is located proximate a middle pair of front and rear stanchions 101, 102, although in one or more alternate embodiments, the clamp assembly 156 may be located at any other position along the length of the side rails 103, 104. For instance, in one embodiment, the clamp assembly 156 may be located at approximately a mid-point along the side rails 103, 104 between the middle pair of front and rear side stanchions 101, 102 and an outermost pair of front and rear stanchions 101, 102.

In the embodiment illustrated in FIG. 1, the clamp assembly 156 includes a pair of front and rear brackets 157, 158, a pair of upper and lower tie rods 159, 160 extending between and interconnecting the brackets 157, 158, and a pair of rail engagement members 161, 162. The rail engagement members 161, 162 facilitate sliding the clamp assembly 156 laterally (arrow 163) along the length of the side rails 103, 104 and into the desired position. The front bracket 157 is configured to engage the front side rail 103 and the rear bracket 158 is configured to engage the rear side rail 104. Although in the illustrated embodiment, the clamp assembly 156 includes two tie rods 159, 160, in one or more alternate embodiment, the clamp assembly 156 may include any other suitable number of tie rods 159, 160, such as, for instance, from one to four tie rods. Although the adjustable storage rack 100 in the illustrated embodiment only includes a single clamp assembly 156 for each pair of front and rear side rails 103, 104, in one or more alternate embodiments, the adjustable storage rack 100 may have any other suitable number of clamp assemblies 156.

With continued reference to the embodiment illustrated in FIG. 1, each of the brackets 157, 158 of the clamp assembly 156 are hat-shaped and include a vertical plate 164, a pair of horizontal plates 165, 166 extending from opposite ends of the vertical plate 164, and a pair of upper and lower vertical plates 167, 168 extending in opposite directions from respective horizontal plates 165, 166. Additionally, in the illustrated embodiment, the upper tie rod 159 extends through openings in the upper vertical plates 167 of the brackets 157, 158 and the lower tie rod 160 extends through openings in the lower vertical plates 168 of the brackets 157, 158. The upper and lower tie rods 159, 160 may be coupled to the brackets 157, 158 by any suitable mechanism, such as, for instance, by mechanical fastening with nuts 169.

Still referring to the embodiment illustrated in FIG. 1, the rail engagement members 161, 162 are coupled to the vertical plates 164 of the brackets 157, 158, respectively (e.g., the rail engagement members 161, 162 are coupled to the top portion of the hat-shaped brackets 157, 158). Additionally, in the illustrated embodiment, each of the rail engagement members 161, 162 includes a fastener 170 (e.g., a hex bolt), a nut 171 (e.g., a serrated nut) threadedly engaged to an end of the fastener 170, and a lock washer 172 configured to prevent the fastener 170 from inadvertently counter-rotating and thereby disengaging the nut 171. In the illustrated embodiment, the nut 171 is received in the cavity 120 and engages the rails 118, 119 of the side rails 103, 104. The engagement between the nuts 171 and the rails 118, 119 couples the clamp assembly 156 to the front and rear side rails 103, 104, respectively. In one or more alternate embodiments, the rail engagement members 161, 162 may have any other configuration suitable for slidably engaging the rails 118, 119 of the side rails 103, 104, such as, for instance, one or more rivets, studs, or hooks. Additionally, in one or more embodiments, the rail engagement members 161, 162 may be integrally formed with the brackets 157, 158.

In use, the lateral position of the clamp assemblies 156 may be adjusted by loosening the fasteners 170 and sliding (arrow 163) the clamp assembly 156 along the length of the front and rear side rails 103, 104 and into the desired position. Once the clamp assembly 156 is in the desired position, the fasteners 170 may be retightened to draw the nuts 171 into tighter engagement with the rails 118, 119 and thereby secure the clamp assembly 156 in the desired lateral position. Additionally, the compressive force supplied by the clamp assembly 156 on the front and rear side rails 118, 119 may be adjusted by tightening or loosening the nuts 169 coupling the tie rods 159, 160 to the brackets 157, 158 (e.g., tightening the nuts 169 draws the brackets 157, 158 towards each other and thereby increases the compressive force on the pair of front and rear side rails 103, 104).

Figure 4:
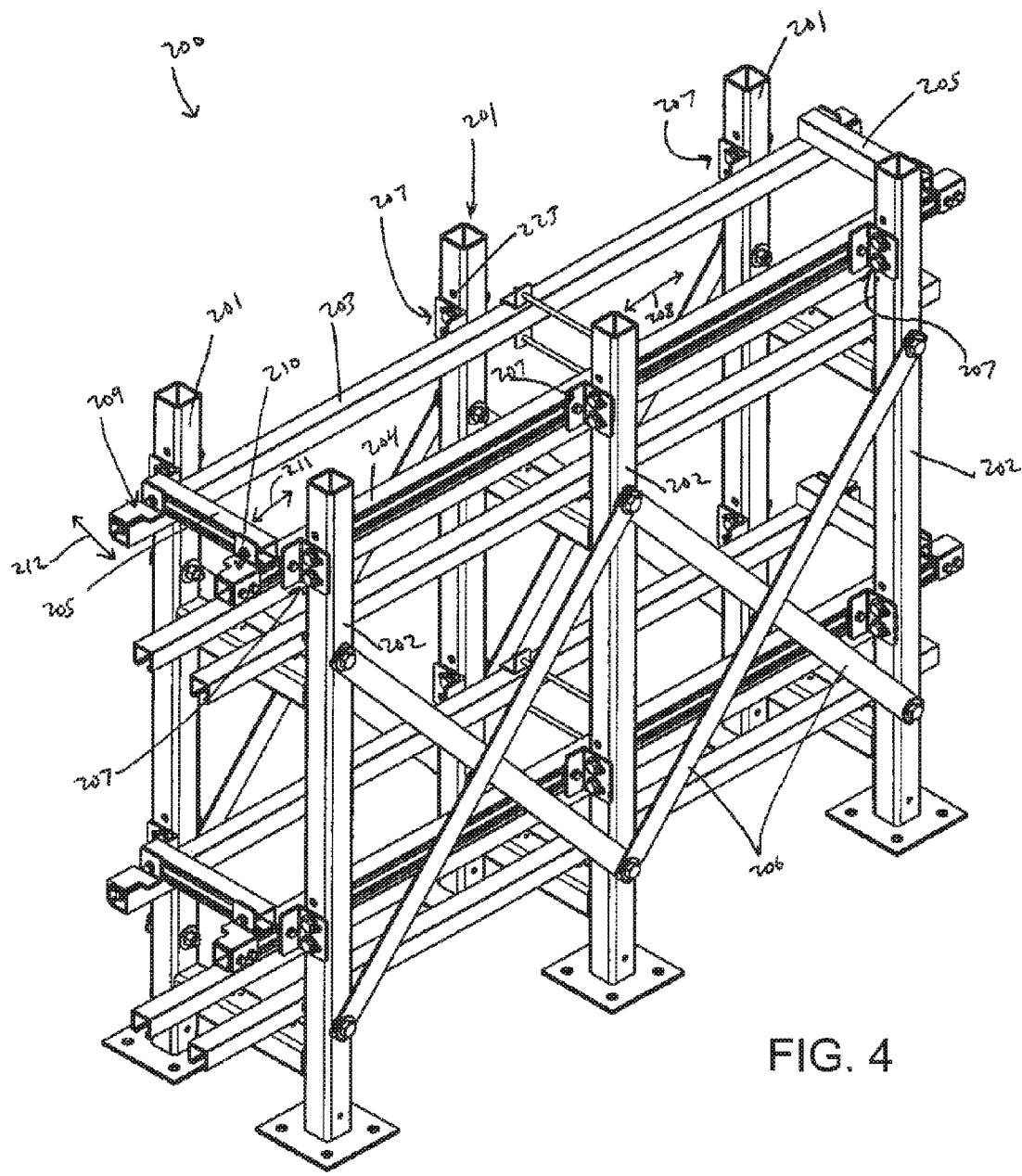
FIG. 4 is a perspective view an adjustable storage rack according to another embodiment of the present disclosure.

With reference now to FIG. 4, an adjustable storage rack 200 according to another embodiment of the present disclosure includes a plurality of front and rear stanchions 201, 202, respectively, and a plurality of front and rear side rails 203, 204, respectively, extending between and interconnecting the front and rear stanchions 201, 202, respectively. The adjustable storage rack 200 further includes a plurality of end rails 205 extending between and interconnecting respective pairs of front and rear side rails 203, 204. The adjustable storage rack 200 may also include a plurality of diagonal support braces 206 extending between adjacent stanchions 201, 202. In one embodiment, the stanchions 201, 202 may be substantially vertical and the plurality of side rails 203, 204 and end rails 205 may be substantially horizontal, although in one or more alternate embodiments, the stanchions 201, 202, the side rails 203, 204, and the end rails 205 may have any other suitable orientations.

Unlike the embodiment of the adjustable storage rack 100 illustrated in FIG. 1, in the embodiment of the storage rack 200 illustrated in FIG. 4, the end rails 205 overlap the side rails 203, 204 (e.g., end portions of the end rails 205 rest on the side rails 203, 204). In one or more alternate embodiments, the end rails 205 may underlap the side rails 203, 204 such that portions of the side rails 203, 204 rest on the end rails 205.

With continued reference to the embodiment illustrated in FIG. 4, the adjustable storage rack 200 also includes a plurality of stanchion adjustment assemblies 207 slidably coupling (arrow 208) the stanchions 201, 202 to the side rails 203, 204 and a plurality of end rail adjustment assemblies 209, 210 slidably coupling (arrow 211) the end rails 205 to the side rails 203, 204. The stanchion adjustment assemblies 207 are configured to facilitate laterally adjusting the position of the stanchions 201, 202 (e.g., the stanchion adjustment assemblies 207 are configured to facilitate laterally sliding (arrow 208) the stanchions 201, 202 along the length of the side rails 203, 204 and into the desired positions). The end rail adjustment assemblies 209, 210 are configured to facilitate laterally adjusting (arrow 211) the position of the end rails 205. The end rail adjustment assemblies 209, 210 are also configured to facilitate fore and aft adjustments of the side rails 203, 204 and the stanchions 201, 202 (e.g., the end rail adjustment assemblies 209, 210 are configured to facilitate sliding (arrow 212) the side rails 203, 204 and the stanchions 201, 202 connected thereto along the length of the end rails 205 and into the desired positions).

Figure 5A:
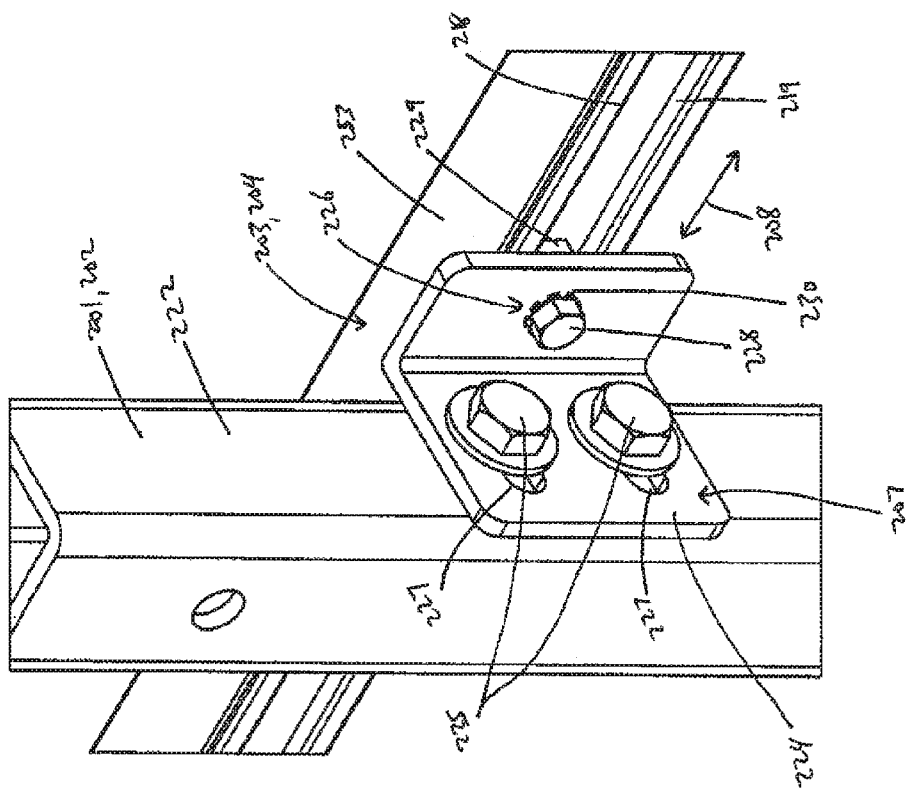
Figure 5B:
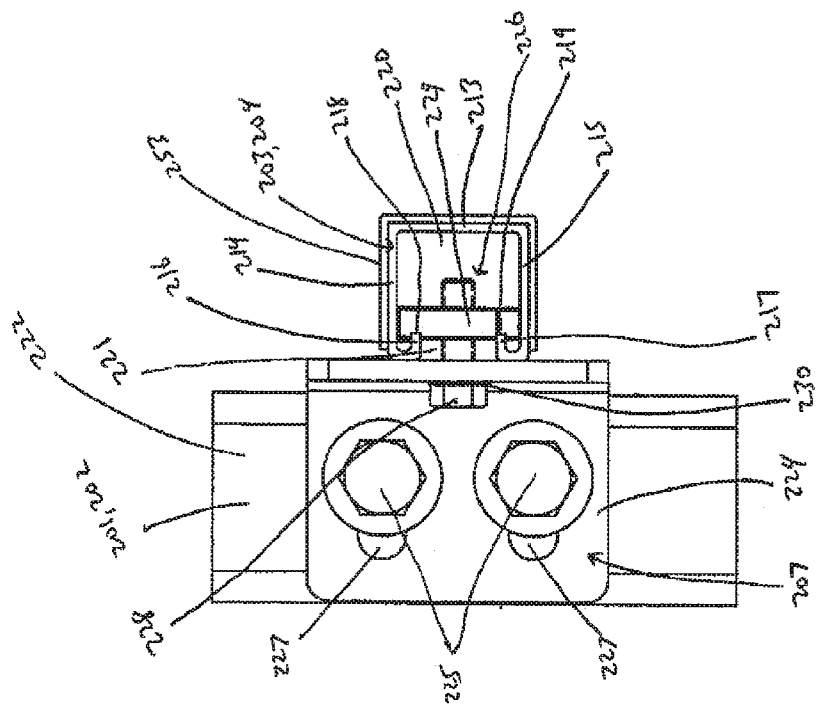

With reference now to the embodiment illustrated in FIGS. 5A-5C, each of the side rails 203, 204 is a C-channel having a web 213 and a pair of upper and lower flanges 214, 215 extending from opposite ends of the web 213. Free ends of the flanges 214, 215 opposite the web 213 include inwardly turned lips 216, 217. Together, the inwardly turned lips 216, 217 define a pair of rails 218, 219 configured to facilitate sliding (arrows 208, 211) the stanchion adjustment assemblies 207 and the end rail adjustment assemblies 209, 210 along the side rails 203, 204, as described in more detail below. Additionally, the side rails 203, 204 each also define a cavity 220 and an opening 221 between the pair of rails 218, 219. The opening 221 between the rails 218, 219 opens up into the cavity 220. In one embodiment, the side rails 203, 204 may be the same or similar to the embodiment of the side rails 103, 104 illustrated in FIGS. 1-3C.

In the embodiment illustrated in FIGS. 5A-5C, each of the stanchions 201, 202 is a square tube having four flat wall segments 222. In one or more alternate embodiments, the stanchions 201, 202 may have any other suitable shape, such as, for instance, a C-channel, a Z-shaped bar, or an L-shaped bar. One of the wall segments 222 of each of the stanchions 201, 202 defines a plurality of openings 223 (e.g., holes or slots) configured to receive fasteners coupling the stanchion adjustment assemblies 207 to the stanchions 201, 202.

With continued reference to the embodiment illustrated in FIGS. 5A-5C, each of the stanchion adjustment assemblies 207 includes a bracket 224, a pair of fasteners 225 for coupling the bracket 224 to one of the stanchions 201, 202, and at least one side rail engagement member 226 configured to facilitate sliding (arrow 208) the bracket 224 along the length of the side rails 203, 204. In one or more alternate embodiments, the brackets 224 may be coupled to the stanchions 201, 202 by any other suitable mechanism, such as, for instance, by hooks received in corresponding slots in the stanchion 201, 202. Additionally, in one embodiment, the brackets 224 may be integrally formed with the stanchions 201, 202.

The bracket 224 also defines one or more openings 227 (e.g., a pair of horizontally oriented slots) configured to receive the pair of fasteners 225 coupling the bracket 224 to the stanchion 201, 202. The horizontally oriented slots 227 facilitate fore and aft adjustment of the position of the bracket 224 relative to the stanchion 201, 202. In this manner, the bracket 224 may be adjusting depending on the position of the side rails 203, 204 relative to the stanchions 201, 202. Although in the illustrated embodiment the bracket 224 of the stanchion adjustment assembly 207 are L-shaped, in one or more alternate embodiments the brackets 224 may have any other suitable shape, such, for instance, Z-shaped.

In the embodiment illustrated in FIGS. 5A-5C, the side rail engagement member 226 of the stanchion adjustment assemblies 207 includes a fastener 228 (e.g., a hex bolt), a nut 229 (e.g., a serrated nut) threadedly engaged to an end of the fastener 228, and a lock washer 230 configured to prevent the fastener 228 from inadvertently counter-rotating and thereby disengaging the nut 229. In the illustrated embodiment, the nut 229 is received in the cavity 220 and engages the rails 218, 219 of the side rail 203, 204. The engagement between the nut 229 and the rails 218, 219 couples the stanchion adjustment assembly 207 to the side rail 218, 219. In one or more alternate embodiments, the rail engagement member 226 may have any other configuration suitable for slidably engaging the rails 218, 219 of the side rails 203, 204, such as, for instance, one or more rivets, studs, or hooks. Additionally, in one or more embodiments, the rail engagement member 226 may be integrally formed with the bracket 224. In one embodiment, the stanchion adjustment assemblies 207 illustrated in FIGS. 5A-5C may be the same or similar to the stanchion adjustment assemblies 107 described above with reference to the embodiment illustrated in FIGS. 2A-2C.

In use, the lateral position of the stanchions 201, 202 may be adjusted by loosening the fastener 228 and sliding (arrow 208) the stanchion adjustment assemblies 207 and the stanchions 201, 202 along the length of the side rail 203, 204 and into the desired positions. Once the stanchions 201, 202 are in the desired positions, the fastener 228 may be retightened to draw the nut 229 into tighter engagement with the rails 218, 219 and thereby secure the stanchions 201, 202 in the desired lateral positions.

With reference now to the embodiment illustrated in FIGS. 6A-6C, the end rails 205 may have the same or substantially the same shape and/or configuration as the side rails 203, 204. In the illustrated embodiment, each end rail 205 is a C-channel having a web 231 and a pair of upper and lower flanges 232, 233 extending out from opposite ends of the web 231. Free ends of the flanges 232, 233 opposite the web 231 include inwardly turned lips 234, 235, which together define a pair of rails 236, 237 configured to facilitate sliding (arrow 212) the end rail adjustment assemblies 209, 210, and the side rails 203, 204 and the stanchions 201, 202 coupled thereto, along the end rails 205. Additionally, the end rail 205 also defines a cavity 238 and an opening 239 between the rails 236, 237. The opening 239 between the rails 236, 237 opens up into the cavity 238. As illustrated in FIG. 4, the end rails 205 are oriented such that the openings 239 between the rails 236, 237 face outward (e.g., the end rails 105 face away from each other). In one embodiment, the end rails 205 may be the same or similar to the end rails 105 described above with reference to the embodiment illustrated in FIGS. 3A-3C.

With continued reference to the embodiment illustrated in FIGS. 6A-6C, the front and rear end rail adjustment assemblies 209, 210 are slidably coupled to opposite ends of the end rails 205. The front end rail adjustment assembly 209 slidably couples a forward end portion of the end rail 205 to one of the forward side rails 203 and the rear end rail adjustment assembly slidably couples a rear end portion of the end rail 205 to one of the rear side rails 204. As illustrated in FIGS. 6A-6C, each of the end rail adjustment assemblies 209, 210 includes a bracket 240 and first and second rail engagement members 241, 242 configured to slidably couple the bracket 240 to the side rail 203, 204 and the end rail 205, respectively. The first rail engagement member 241 facilitates sliding (arrow 211) the bracket 240 and the end rail 205 laterally along the length of the side rail 203, 204, and the second rail engagement member 242 facilitates sliding (arrow 212) the side rails 203, 204 fore and aft along the length of the end rail 205.

In the embodiment illustrated in FIGS. 6A-6C, the bracket 240 includes a base plate 243, a downwardly turned flange 244 extending downward from the base plate 243, and an upwardly turned flange 245 extending upward from the base plate 243. In the illustrated embodiment, the base plate 243 is L-shaped, although in one or more alternate embodiments, the base plate 243 may have any other suitable shape, such as, for instance, square or rectangular. Additionally, in the illustrated embodiment, the downwardly turned flange 244 is vertical or substantially vertical and is substantially parallel to the web 213 of the side rail 203, 204. Further, in the illustrated embodiment, the base plate 243 of the bracket 240 is substantially horizontal and abuts or rests on the upper flange 214 of the side rail 203, 204. The upwardly turned flange 245 is vertical or substantially vertical and is substantially parallel to the web 231 of the end rail 205. Accordingly, the bracket 240 of the end rail adjustment assemblies 209, 210 extends from the opening 221 between the rails 218, 219 in the side rail 203, 204, over the side rail 203, 204, and to the opening 239 between the rails 236, 237 in the end rail 205. Additionally, in one embodiment, the downwardly turned flange 244 and the upwardly turned flange 245 extend in the same direction as the side rail 203, 204 and the end rail 205, respectively. Accordingly, in one embodiment in which the side rails 203, 204 are perpendicular or substantially perpendicular to the end rails 205, the downwardly turned flange 244 on the bracket 240 may be perpendicular or substantially perpendicular to the upwardly turned flange 245 on the bracket 240. In one or more alternate embodiments, the downwardly and upwardly turned flanges 244, 245 on the bracket 240 may define any other angle therebetween depending on the angle defined between the end rail 205 and the side rails 203, 204.

In the embodiment illustrated in FIGS. 6A-6C, the first rail engagement member 241 is coupled to the downwardly turned flange 244 and the second rail engagement member 242 is coupled to the upwardly turned flange 245 on the bracket 240. The rail engagement members 241, 242 of the end rail adjustment assemblies 209, 210 may be the same or similar to the side rail engagement members 226 of the stanchion adjustment assemblies 207. In the embodiment illustrated in FIGS. 6A-6C, the first rail engagement member 241 includes a pair of fasteners 246 (e.g., two hex bolts), a pair of corresponding nuts 247 (e.g., two serrated nuts) threadedly engaged to ends of the fasteners 246, and a pair of lock washers 248 configured to prevent the fasteners 246 from inadvertently counter-rotating and thereby disengaging the nuts 247. In the illustrated embodiment, the nuts 247 are received in the cavity or chamber 220 defined by the side rail 203, 204. Additionally, the nuts 247 are wider than the opening 221 defined between the inwardly turned lips 216, 217 on the side rail 203, 204 (e.g., the nuts 247 are wider than the gap between the rails 218, 219). Accordingly, portions of the nuts 247 engage the rails 218, 219 of the side rail 203, 204 (i.e., portions of the nuts 247 engage the inwardly turned lips 216, 217 on the side rail 203, 204). The engagement between the nuts 247 and the rails 218, 219 couples the end rail adjustment assemblies 209, 210 to the side rail 203, 204. Additionally, tightening the fasteners 246 is configured to draw the nuts 247 into tighter engagement with the rails 218, 219 and loosening the fasteners 246 is configured to move the nuts 247 into looser engagement with the rails 218, 219.

With continued reference to the embodiment illustrated in FIGS. 6A-6C, the second rail engagement member 242 includes a fastener 249 (e.g., a hex bolt), a corresponding nut 250 (e.g., a serrated nut) threadedly engaged to an end of the fastener 249, and a lock washer 251 configured to prevent the fastener 249 from inadvertently counter-rotating and thereby disengaging the nut 250. In the illustrated embodiment, the nut 250 is received in the cavity or chamber 238 defined by the end rail 205. Additionally, the nut 250 is wider than the opening 239 defined between the inwardly turned lips 234, 235 on the end rail 205 (e.g., the nut 250 is wider than the gap between the rails 236, 237). Accordingly, portions of the nut 250 engage the rails 236, 237 of the end rail 205 (i.e., portions of the nut 250 engage the inwardly turned lips 234, 235 on the end rail 205). The engagement between the nut 250 and the rails 236, 237 couples the end rail adjustment assemblies 209, 210 to the end rail 205. Additionally, tightening the fastener 249 is configured to draw the nut 250 into tighter engagement with the rails 236, 237 and loosening the fastener 249 is configured to move the nut 250 into looser engagement with the rails 236, 237.

In one or more alternate embodiments, the first and second rail engagement members 241, 242 may have any other configuration suitable for slidably engaging the rails 218, 219 and 236, 237 of the side rails 203, 204 and the end rail 205, respectively. For instance, in one embodiment, the first and/or second rail engagement members 241, 242 may include one or more rivets, studs, or hooks. Additionally, in one or more embodiments, the first and/or second rail engagement members 241, 242 may be integrally formed with the bracket 240. Although in the illustrated embodiment the first rail engagement member 241 includes two fasteners 246 and the second rail engagement member 242 includes one fastener 249, in one or more alternate embodiments, the first and second rail engagement members 241, 242 may include any other suitable number of fasteners and corresponding nuts, such as, for instance, from one to four fasteners and corresponding nuts.

In use, the lateral position of the end rails 205 may be adjusted by loosening the fasteners 246 of the first rail engagement member 241 that couple the end rail adjustment assemblies 209, 210 to the side rails 203, 204 and then sliding (arrow 211) the end rail adjustment assemblies 209, 210 and the end rails 205 along the rails 218, 219 of the side rails 203, 204 and into the desired position. The fore and aft positions of the side rails 203, 204 and the stanchions 201, 202 coupled thereto may be adjusted by loosening the fasteners 249 of the second rail engagement member 242 that couple the end rail adjustments assemblies 209, 210 to the end rail 205 and then sliding (arrow 212) the side rails 203, 204 and the stanchions 201, 202 fore and/or aft along the rails 236, 237 of the end rails 205 and into the desire positions. Once the end rail 205 and the side rails 203, 204 are in the desired positions, the fasteners 246, 249 may be retightened to secure the end rails 205 and the side rails 203, 204 into the desired positions.

With reference now to the embodiment illustrated in FIGS. 5A-6C, the adjustable storage rack 200 may also include a plurality of side rail covers 252 and a plurality of end rail covers 253. Each of the side rail covers 252 is configured to cover the web 213 and at least a portion of the upper and lower flanges 214, 215 of the side rail 203, 204. Each of the end rail covers 253 is configured to cover the web 231 and at least a portion of the upper and lower flanges 232, 233 of the end rail 205. In the illustrated embodiment, the side and end rail covers 252, 253 are C-shaped, although in one or more alternate embodiments, the side and end rail covers 252, 253 may have any other suitable shape depending on the shape of the side rails 203, 204 and the end rails 205, respectively. In one or more alternate embodiments, the adjustable storage rack 200 may be provided without the side and end rail covers 252, 253.

In one embodiment, the adjustable storage racks 100, 200 of the present disclosure may be seismically rated. For instance, the adjustable storage racks 100, 200 according to the embodiments described above meet or exceed the Uniform and International building codes for seismic safety (e.g., International Building Code 2012). The adjustable storage racks 100, 200 of the present disclosure may be configured to have any desired seismic rating. For instance, the adjustable storage rack 100 illustrated in FIG. 1 may be a light-seismic rack and the adjustable storage rack 200 illustrated in FIG. 4 may be a heavy-seismic rack.

The adjustable storage racks 100, 200 of the present invention may also include a spill containment assembly configured to collect and/or neutralize hazardous substances (e.g., battery acid) leaked from the equipment or other devices (e.g., batteries) supported by the adjustable storage rack 100, 200. The spill containment assembly may be located below the adjustable storage rack 100, 200 and may be coupled to one or more of the stanchions 101, 102, 201, 202 and/or the substrate (e.g., a floor) on which the adjustable storage rack 100, 200 is supported. Suitable spill containment assemblies are described in U.S. patent application Ser. No. 14/267,821, filed May 1, 2014 and entitled "Battery Spill Containment System and Method of Making the Same," the entire content of which is incorporated herein by reference.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween. Additionally, when a component is referred to as "engaging" another component, it can directly or indirectly contact the component due to the presence of intervening components and/or coatings therebetween.

What is claimed is:

1. An adjustable rack for storing a lead acid battery, comprising:
 a first upright frame comprising a first front stanchion spaced apart and attached to a first rear stanchion through a first cross member;
 a second upright frame comprising a second front stanchion spaced apart and attached to a second rear stanchion through a second cross member, the first upright frame being spaced apart from the second upright frame with the first front stanchion substantially aligned with the second front stanchion and the first rear stanchion substantially aligned with the second rear stanchion;
 a battery support spanning between the first upright frame and the second upright frame;
 a front side rail spanning between the first front stanchion and the second front stanchion, the front side rail positioned above the battery support;
 a rear side rail spanning between the first rear stanchion and the second rear stanchion, the rear side rail being spaced apart from the front side rail, the rear side rail positioned above the battery support, the front side rail and rear side rail sufficiently spaced to receive the lead acid battery therebetween;
 a first bracket adjustably connecting the front side rail to the first front stanchion, adjustment of the first bracket relative to the first front stanchion permitting lateral movement of the front side rail relative to the rear side rail; and
 a second bracket adjustably connecting the front side rail to the second front stanchion, adjustment of the second bracket relative to the second front stanchion permitting lateral movement of the front side rail relative to the rear side rail;
 wherein the first bracket is structurally similar to the second bracket, the first bracket comprising an angle bracket with a first plate and a second plate, the first plate having a slot to receive a threaded fastener therethrough to secure the angle bracket to the first front stanchion by tightening the threaded fastener to attach the angle bracket securely to the first front stanchion, the first bracket being adjustable by movement along the slot relative to the threaded fastener for permitting lateral movement of the front side rail toward or away from the rear side rail when the threaded fastener is loosened.

2. The adjustable rack of claim 1 wherein the first bracket is adjusted in conjunction with the second bracket so that the front side rail is adjustable to be substantially parallel to the rear side rail, a distance between the front side rail and a rear side rail being adjustable.

3. The adjustable rack of claim 1 further comprising:
 a third bracket adjustably connecting the rear side rail to the first rear stanchion, adjustment of the third bracket relative to the first rear stanchion permitting lateral movement of the rear side rail relative to the front side rail; and
 a fourth bracket adjustably connecting the rear side rail to the second rear stanchion, adjustment of the fourth bracket relative to the second rear stanchion permitting lateral movement of the rear side rail relative to the front side rail.

4. The adjustable rack of claim 3 wherein the battery support comprises a first horizontal beam alongside and spaced apart from a second horizontal beam.

5. The adjustable rack of claim 4 wherein the first horizontal beam and the second horizontal beam are supported and spanning across the first cross member and the second cross member.

6. The adjustable rack of claim 3 further comprising an end rail spanning substantially perpendicularly between the front side rail and the rear side rail, a front end rail bracket adjustably connecting a front end of the end rail to the front side rail such that lateral movement of the front side rail relative to the rear side rail is accommodated by the front end rail bracket, and a rear end rail bracket adjustably connecting a rear end of the end rail to the rear side rail such that lateral movement of the rear side rail relative to the front side rail is accommodated by the rear end rail bracket.

7. The adjustable rack of claim 1 wherein the battery support is supported by the first cross member and the second cross member.

8. The adjustable rack of claim 1 wherein a second fastener connects the second plate to the front side rail, the fastener being engaged to a nut within a channel of the front side rail to secure the angle bracket to the front side rail.

9. The adjustable rack of claim 1 further comprising an end rail spanning substantially perpendicularly between the front side rail and the rear side rail, a front end rail bracket adjustably connecting a front end of the end rail to the front side rail such that lateral movement of the front side rail relative to the rear side rail is accommodated by the front end rail bracket.

10. An adjustable rack for storing a lead acid battery, comprising:
 a first upright frame comprising a first front stanchion spaced apart and attached to a first rear stanchion through a first cross member;
 a second upright frame comprising a second front stanchion spaced apart and attached to a second rear stanchion through a second cross member, the first upright frame being spaced apart from the second upright frame with the first front stanchion substantially aligned with the second front stanchion and the first rear stanchion substantially aligned with the second rear stanchion;
 a battery support spanning between the first upright frame and the second upright frame, and supported by the first cross member and the second cross member;
 a front side rail spanning between the first front stanchion and the second front stanchion, the front side rail positioned above the battery support;
 a rear side rail spanning between the first rear stanchion and the second rear stanchion, the rear side rail being spaced apart from the front side rail, the rear side rail positioned above the battery support, the front side rail and rear side rail sufficiently spaced to receive the lead acid battery therebetween;

a first bracket adjustably connecting the front side rail to the first front stanchion, adjustment of the first bracket relative to the first front stanchion permitting lateral movement of the front side rail relative to the rear side rail;

a second bracket adjustably connecting the front side rail to the second front stanchion, adjustment of the second bracket relative to the second front stanchion permitting lateral movement of the front side rail relative to the rear side rail;

a third bracket adjustably connecting the rear side rail to the first rear stanchion, adjustment of the third bracket relative to the first rear stanchion permitting lateral movement of the rear side rail relative to the front side rail; and a fourth bracket adjustably connecting the rear side rail to the second rear stanchion, adjustment of the fourth bracket relative to the second rear stanchion permitting lateral movement of the rear side rail relative to the front side rail;

wherein the first bracket is structurally similar to the second bracket, the third bracket, and to the fourth bracket, the first bracket comprising an angle bracket with a first plate and a second plate, the first plate having a slot to receive a threaded fastener therethrough to secure the angle bracket to the first front stanchion by tightening the threaded fastener to attach the angle bracket securely to the first front stanchion, the first bracket being adjustable by movement along the slot relative to the threaded fastener for permitting lateral movement of the front side rail toward or away from the rear side rail when the threaded fastener is loosened.

11. The adjustable rack of claim 10 wherein the battery support comprises a first horizontal beam alongside and spaced apart from a second horizontal beam.

12. The adjustable rack of claim 11 wherein the first horizontal beam and the second horizontal beam are supported and spanning across the first cross member and the second cross member.

13. The adjustable rack of claim 10 wherein a second fastener connects the second plate to the front side rail, the fastener being engaged to a nut within a channel of the front side rail to secure the angle bracket to the front side rail.

14. The adjustable rack of claim 10 further comprising an end rail spanning substantially perpendicularly between the front side rail and the rear side rail, a front end rail bracket adjustably connecting a front end of the end rail to the front side rail such that lateral movement of the front side rail relative to the rear side rail is accommodated by the front end rail bracket, and a rear end rail bracket adjustably connecting a rear end of the end rail to the rear side rail such that lateral movement of the rear side rail relative to the front side rail is accommodated by the rear end rail bracket.

* * * * *